(12) United States Patent
Miyazawa

(10) Patent No.: US 7,472,997 B2
(45) Date of Patent: Jan. 6, 2009

(54) MULTI-PROJECTION DISPLAY AND PROJECTOR UNIT

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 317 days.

(21) Appl. No.: 11/193,439

(22) Filed: Aug. 1, 2005

(65) Prior Publication Data

US 2006/0028625 A1 Feb. 9, 2006

(30) Foreign Application Priority Data

Aug. 3, 2004 (JP) ............................. 2004-226368

(51) Int. Cl.
*G03B 21/14* (2006.01)
*G03B 21/00* (2006.01)

(52) U.S. Cl. .......................... 353/94; 353/69

(58) Field of Classification Search .................. 353/88, 353/89, 94, 97, 122, 69; 349/8–10
See application file for complete search history.

(56) References Cited

U.S. PATENT DOCUMENTS

| | | | |
|---|---|---|---|
| 5,379,083 A * | 1/1995 | Tomita | 353/122 |
| 5,519,518 A | 5/1996 | Watanabe et al. | |
| 5,597,223 A | 1/1997 | Watanabe et al. | |
| 6,480,175 B1 * | 11/2002 | Schneider | 345/32 |
| 6,561,651 B1 * | 5/2003 | Kubota et al. | 353/30 |
| 6,683,657 B1 | 1/2004 | Miyawaki | |
| 6,733,138 B2 * | 5/2004 | Raskar | 353/94 |
| 6,771,307 B2 | 8/2004 | Waki et al. | 348/189 |
| 6,781,563 B2 | 8/2004 | Nishio et al. | |
| 6,824,271 B2 * | 11/2004 | Ishii et al. | 353/31 |
| 2001/0019358 A1 | 9/2001 | Waki et al. | 348/189 |
| 2002/0024640 A1 * | 2/2002 | Ioka | 353/94 |
| 2003/0142276 A1 * | 7/2003 | English et al. | 353/31 |
| 2003/0227599 A1 * | 12/2003 | Weissman et al. | 353/94 |
| 2005/0117126 A1 * | 6/2005 | Miyazawa et al. | 353/94 |
| 2005/0206857 A1 * | 9/2005 | Yamada | 353/94 |

FOREIGN PATENT DOCUMENTS

| | | |
|---|---|---|
| JP | A-8-106090 | 4/1996 |
| JP | 2001-251651 A | 9/2001 |
| JP | A-2001-339672 | 12/2001 |
| JP | A-2003-207850 | 7/2003 |
| JP | A-2004-101722 | 4/2004 |

* cited by examiner

*Primary Examiner*—Hung Henry Nguyen
(74) *Attorney, Agent, or Firm*—Oliff & Berridge PLC

(57) ABSTRACT

A multi-projection display includes a plurality of projector units each including a light source, an electrooptic modulator, and a projection system. The multi-projection display displays an image on a projection screen by tiling projection using the plurality of projector units. Each of the projector units further includes a light-quantity controller that controls the quantity of light to be projected from the projection system.

6 Claims, 17 Drawing Sheets

FIG. 12B

| RELATIVE BRIGHTNESS BEFORE LIGHT CONTROL | : 100% | RELATIVE BRIGHTNESS BEFORE LIGHT CONTROL | : 95% |
|---|---|---|---|
| QUANTITY OF LIGHT ADJUSTED BY LIGHT-QUANTITY CONTROLLER | : 73% | QUANTITY OF LIGHT ADJUSTED BY LIGHT-QUANTITY CONTROLLER | : 68% |
| RELATIVE BRIGHTNESS AFTER LIGHT CONTROL | : 27% | RELATIVE BRIGHTNESS AFTER LIGHT CONTROL | : 27% |
| RELATIVE BRIGHTNESS BEFORE LIGHT CONTROL | : 90% | RELATIVE BRIGHTNESS BEFORE LIGHT CONTROL | : 95% |
| QUANTITY OF LIGHT ADJUSTED BY LIGHT-QUANTITY CONTROLLER | : 63% | QUANTITY OF LIGHT ADJUSTED BY LIGHT-QUANTITY CONTROLLER | : 68% |
| RELATIVE BRIGHTNESS AFTER LIGHT CONTROL | : 27% | RELATIVE BRIGHTNESS AFTER LIGHT CONTROL | : 27% |

FIG. 12C

| RELATIVE BRIGHTNESS BEFORE LIGHT CONTROL | : 100% | RELATIVE BRIGHTNESS BEFORE LIGHT CONTROL | : 95% |
|---|---|---|---|
| QUANTITY OF LIGHT ADJUSTED BY LIGHT-QUANTITY CONTROLLER | : 73% | QUANTITY OF LIGHT ADJUSTED BY LIGHT-QUANTITY CONTROLLER | : 41% |
| RELATIVE BRIGHTNESS AFTER LIGHT CONTROL | : 27% | RELATIVE BRIGHTNESS AFTER LIGHT CONTROL | : 54% |
| RELATIVE BRIGHTNESS BEFORE LIGHT CONTROL | : 90% | RELATIVE BRIGHTNESS BEFORE LIGHT CONTROL | : 95% |
| QUANTITY OF LIGHT ADJUSTED BY LIGHT-QUANTITY CONTROLLER | : 36% | QUANTITY OF LIGHT ADJUSTED BY LIGHT-QUANTITY CONTROLLER | : 41% |
| RELATIVE BRIGHTNESS AFTER LIGHT CONTROL | : 54% | RELATIVE BRIGHTNESS AFTER LIGHT CONTROL | : 54% |

FIG. 13A

SCR

| RELATIVE BRIGHTNESS BEFORE LIGHT CONTROL | : 100% | RELATIVE BRIGHTNESS BEFORE LIGHT CONTROL | : 95% |
|---|---|---|---|
| QUANTITY OF LIGHT ADJUSTED BY LIGHT-QUANTITY CONTROLLER | : 28% | QUANTITY OF LIGHT ADJUSTED BY LIGHT-QUANTITY CONTROLLER | : 23% |
| RELATIVE BRIGHTNESS AFTER LIGHT CONTROL | : 72% | RELATIVE BRIGHTNESS AFTER LIGHT CONTROL | : 72% |
| RELATIVE BRIGHTNESS BEFORE LIGHT CONTROL | : 90% | RELATIVE BRIGHTNESS BEFORE LIGHT CONTROL | : 90% |
| QUANTITY OF LIGHT ADJUSTED BY LIGHT-QUANTITY CONTROLLER | : 18% | QUANTITY OF LIGHT ADJUSTED BY LIGHT-QUANTITY CONTROLLER | : 23% |
| RELATIVE BRIGHTNESS AFTER LIGHT CONTROL | : 72% | RELATIVE BRIGHTNESS AFTER LIGHT CONTROL | : 72% |

FIG. 13B

SCR

| RELATIVE BRIGHTNESS BEFORE LIGHT CONTROL | : 85% | RELATIVE BRIGHTNESS BEFORE LIGHT CONTROL | : 80% |
|---|---|---|---|
| QUANTITY OF LIGHT ADJUSTED BY LIGHT-QUANTITY CONTROLLER | : 13% | QUANTITY OF LIGHT ADJUSTED BY LIGHT-QUANTITY CONTROLLER | : 18% |
| RELATIVE BRIGHTNESS AFTER LIGHT CONTROL | : 72% | RELATIVE BRIGHTNESS AFTER LIGHT CONTROL | : 72% |
| RELATIVE BRIGHTNESS BEFORE LIGHT CONTROL | : 75% | RELATIVE BRIGHTNESS BEFORE LIGHT CONTROL | : 79% |
| QUANTITY OF LIGHT ADJUSTED BY LIGHT-QUANTITY CONTROLLER | : 3% | QUANTITY OF LIGHT ADJUSTED BY LIGHT-QUANTITY CONTROLLER | : 17% |
| RELATIVE BRIGHTNESS AFTER LIGHT CONTROL | : 72% | RELATIVE BRIGHTNESS AFTER LIGHT CONTROL | : 72% |

MULTI-PROJECTION DISPLAY AND PROJECTOR UNIT

This nonprovisional application claims the benefit of Japanese Patent Application No. 2004-226368, filed Aug. 3, 2004. The entire disclosure of the prior application is hereby incorporated by reference herein in its entirety.

BACKGROUND

The exemplary embodiments relate to a multi-projection display that displays images projected by a plurality of projector units on a large screen, and projector units used for the same.

FIG. 15 is a schematic diagram of a multi-projection display 900. The multi-projection display 900 includes a plurality of projector units $PJ_A$, $PJ_B$, $PJ_C$, and $PJ_D$ disposed horizontally or vertically, as shown in FIG. 15. The multi-projection display 900 displays one large image on a screen SCR such that unit images $I_A$, $I_B$, $I_C$, and $I_D$ projected by the projector units $PJ_A$, $PJ_B$, $PJ_C$, and $PJ_D$ are tiling-projected. Since the multi-projection display 900 can display higher-definition and higher-intensity images than common projectors, it will come into widespread use in the field of business such as theaters, art museums, museums, rooms sized for seminars or meetings, mini theaters, public offices, companies, and for personal or recreational use, such as in home theaters.

Such a multi-projection display has a problem in that variations in intensity and tone of color from projector unit to projector unit prevent a totally even image from being displayed. FIG. 16 is a schematic to explain the problems of this multi-projection display.

Specifically, in this multi-projection display, even if projection images having equal pixel values in the whole projection region (for example, white display images with the highest intensity in the whole projection region) are projected from the projector units, with variations in intensity from one projection unit to another, the relative brightness on the screen SCR varies by, for example, 100%, 95%, 90%, and 95%, as shown in FIG. 16.

Also, in this multi-projection display, when the tone of color varies from one projection unit to another, for example, when the image projected by one projector unit is reddish, the region to which the projection image from the projector unit is projected also becomes reddish.

Thus, the multi-projection display has a problem in that variations in intensity and tone of color from one projector unit to another prevent a totally even image from being displayed.

FIG. 17 is a schematic of the function of a related-art multi-projection display in which the foregoing problems are solved. A related-art multi-projection display (not shown) controls light amounts in such a way that it projects images having an equal pixel value in all projection regions (for example, white display images with the highest intensity in all projection regions, red display images with the highest intensity in all projection regions, green display images with the highest intensity in all projection regions, or blue display images with the highest intensity in all projection regions) as adjusting unit images by the projector units. The related art multi-projection display further photographs the images with a digital camera or measures the color with a colorimeter to calculate adjustment amount from one projector unit to another. The related art multi-projection display also controls original-image information to be inputted to electrooptic modulators from one projector unit to another using the calculated adjustment amount (see, for example, paragraphs 42 and 43 of JP-A-2001-251651).

Accordingly, with the related-art multi-projection display, for example, when the projector units project projection images having an equal pixel value in all projection regions (for example, white display images with the highest intensity in all projection regions), even with variations in intensity from one projection unit to another, the intensities of the projector units can be consistent with one another by adjusting the brightness on the screen SCR to an even brightness, as shown in FIG. 17.

Also, in the related art multi-projection display, even with variations in tone of color from one projection unit to another, for example, when the projection image formed in one projector unit is reddish, the tone of color of the projector units can be consistent with one another by decreasing the red component of the image information to be sent to the projection unit.

Thus, the related-art multi-projection display allows the intensity and tone of color of the projector units to be consistent with one another, providing totally even images.

However, to have consistency in intensity and tone of color of the projector units, the related art multi-projection display must adjust the light quantity by reducing the light transmittance of the electrooptic modulators of at least the projector units, other than a projector unit having the lowest intensity, as shown in FIG. 17. This requires the use of gradation sources in the electrooptic modulators, posing the problem of decreasing the number of effective gray levels inherent to the related-art multi-projection display or narrowing the dynamic range.

SUMMARY

An advantage of the exemplary embodiments is to provide a multi-projection display capable of displaying totally even images without decreasing the number of effective gray levels inherent to the multi-projection display or narrowing the dynamic range. Another advantage of the exemplary embodiments is to provide a projector used for such a multi-projection display.

(1) According to an aspect of the exemplary embodiments, a multi-projection display is provided. The multi-projection display includes a plurality of projector units each including a light source, an electrooptic modulator, and a projection system. The multi-projection display displays an image on a projection screen by tiling projection using the plurality of projector units. Each of the plurality of projection units further includes a light-quantity controller that controls the quantity of light to be projected from the projection system.

Accordingly, the multi-projection display according to an aspect of the exemplary embodiments can adjust the quantity of light to be projected by the projection system one projector unit to another using the light quantity controller. Accordingly, the intensities and the tones of color of the projector units can be consistent with one another without using the gradation sources of the electrooptic modulators of the projector units. Thus, totally even images can be displayed without decreasing the number of effective gray levels inherent to the multi-projection display or narrowing the dynamic range, offering the above-described advantages.

In the multi-projection display as set forth in (1), the light-quantity controller can be a dimmer capable of adjusting the transmission of light or an optical limiting device capable of adjusting the passage of light.

With such a structure, the quantity of light to be projected by the projection system can be adjusted, one projector unit to another, using the light quantity controller or the light limiting device provided for each projector unit.

The dimmer may be a liquid-crystal dimmer, an electrochromic device, or a rotary polarizer. The light limiting device may be disposed in the vicinity of the position in the projection system of each projector unit to which beams are converged.

(3) In the multi-projection display as set forth in (1) or (2), the plurality of projector units each include a plurality of electrooptic modulators as the electrooptic modulator, a color-separation waveguide system that separates the light from the light source into multiple color lights and guides them to the electrooptic modulators, respectively, and a color combining system that combines the color lights modulated by the electrooptic modulators; and the light-quantity controller be disposed in an optical path from the light source to the color-separation waveguide system or an optical path from the color combining system to the projection system.

With such a structure, a color multi-projection display that uses multiple electrooptic modulators for each of the projector units can accurately be consistent in intensity with one another.

(4) In the multi-projection display as set forth in (1) or (2), the plurality of projector units each include a plurality of electrooptic modulators as the electrooptic modulator, a color-separation waveguide system that separates the light from the light source into multiple color lights and guides them to the electrooptic modulators, respectively, and a color combining system that combines the color lights modulated by the electrooptic modulators; and the light-quantity controller be disposed in each of optical paths from the color-separation waveguide system to the color combining system.

With such a structure, a color multi-projection display that uses multiple electrooptic modulators for each of the projector units can accurately be consistent in intensity and tone of color with one another.

(5) In the multi-projection display as set forth in one of (1) to (4), the light-quantity controller controls the quantity of light on the basis of the imaged result of a projection image projected to a projection surface.

With such a structure, the quantity of light can be adjusted according to the photographed image of an actual projection image projected to the projection surface. Accordingly, a color multi-projection display that uses electrooptic modulators for each of the projector units can accurately be consistent in intensity and tone of color with one another.

(6) The multi-projection display as set forth in (5) further includes an imaging device that images a projection image projected to the projection surface.

With such a structure, the image projected on a projection surface can be imaged easily at any time, allowing light quantity to be adjusted immediately as the need arises. Accordingly, the multi-projection display can always display a totally even image.

(7) In the multi-projection display as set forth in (5) or (6), the light-quantity controller controls the quantity of light dynamically in consideration of information on the image to be projected by a projector unit to which the controller itself belongs.

With such a structure, the light quantity controller can control the quantity of light according to the brightness of a projection image even when the image to be projected by itself is dark as well as it is light. Accordingly, most of the gradation sources of the electrooptic modulators can be used only for expressing gradation between the lightest region and the darkest region of the image to be projected by the projector unit itself. This increases the number of effective gray levels of the multi-projection display or broadens the dynamic range.

Also when an image to be projected has variations in brightness from region to region, the light quantity controller can provide the optimum light-quantity control according to the brightness of the projection image from one projector unit to another. Accordingly, most of the gradation sources of the electrooptic modulators can be used only for expressing gradation between the lightest region and the darkest region of the image to be projected by the projector unit itself. This further increases the number of effective gray levels of the multi-projection display or broadens the dynamic range.

(8) In the multi-projection display as set forth in one of (1) to (7), the light-quantity controller controls the quantity of light in response to variation per hour in the quantity of light from the light source.

With such a structure, even when the intensity or the color temperature of the light source is changed owing to the long use of the light source, the decrease in the intensity or the change in color temperature of the light source can be compensated in response to that, allowing the image quality of the multi-projection display to be kept constant.

In the multi-projection display according to an aspect of the exemplary embodiments, the quantity of light to be adjusted by the light quantity controller may be set stronger (or the light transmittance be set lower) at the start of using the light source. Thus, a decrease in intensity of the light source because of using the light source can be compensated by decreasing the quantity of light adjusted by the light quantity controller. Also a change in the color temperature of the light source due to using the light source can be compensated flexibly because the quantity of light adjusted by the light quantity controller can be changed from color to color.

(9) According to another aspect of the exemplary embodiments, there is provided a projector unit used for a multi-projection display. The projector unit includes a light source, an electrooptic modulator, a projection system, and a light-quantity controller that controls the quantity of light to be projected from the projection system.

Thus, the above-described high-quality multi-projection display can be provided using the projector unit according to the exemplary embodiments.

BRIEF DESCRIPTION OF THE DRAWINGS

The exemplary embodiments will be described with reference to the accompanying drawings, wherein like numbers reference like elements, and wherein:

FIG. 12B is a schematic of a display example in which an image to be projected is dark as a whole in the fifth exemplary embodiment;

FIG. 12C is a schematic of a display example in which an image to be projected has variations in brightness from region to region in the fifth exemplary embodiment;

FIG. 13A is a schematic of a display state when a light source is put into use in a sixth exemplary embodiment of the invention;

FIG. 13B is a schematic of a display state when the light source was used for a long time in the sixth exemplary embodiment;

DETAILED DESCRIPTION OF EMBODIMENTS

A multi-projection display according to the exemplary embodiments will be described hereinbelow.

First Exemplary Embodiment

Figure 1A:
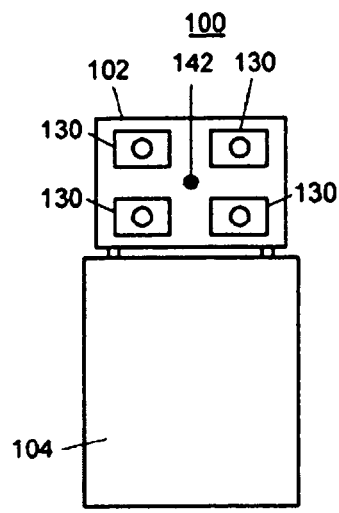
FIG. 1A is a front view of a multi-projection display according to a first exemplary embodiment of the invention.
Figure 1B:
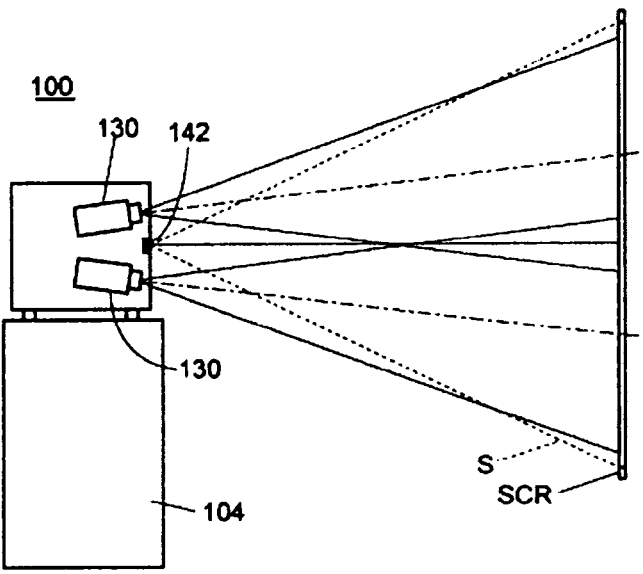
FIG. 1B is a cross section of the multi-projection display, viewed from the side, according to the first exemplary embodiment.
Figure 1C:
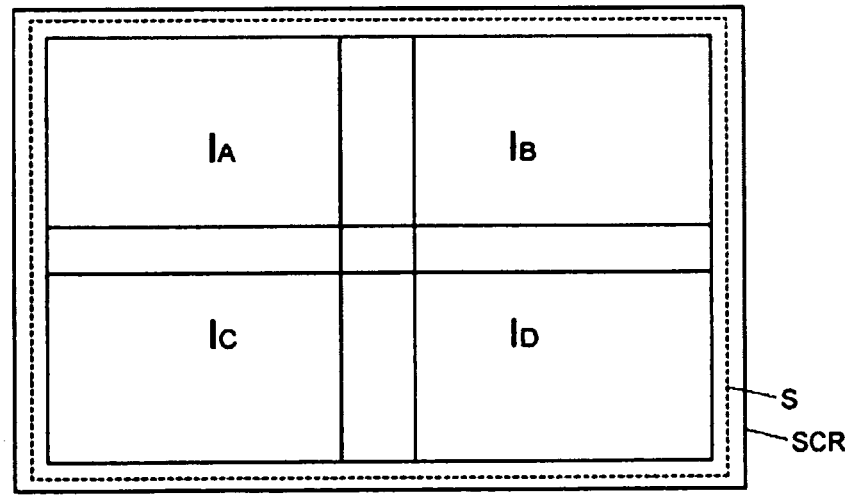
FIG. 1C is a schematic of an image projected on a screen in the first exemplary embodiment.

FIGS. 1A to 1C are schematics of a multi-projection display 100 according to a first exemplary embodiment, wherein FIG. 1A is a front view, FIG. 1B is a cross section viewed from the side, and FIG. 1C is a schematic of an image projected on a screen.

As shown in FIGS. 1A to 1C, the multi-projection display 100 according to the first exemplary embodiment includes four projector units 130 disposed in a casing 102, and displays unit projection images $I_A$, $I_B$, $I_C$, and $I_D$ from the projector units 130 by tiling-projection onto a screen SCR serving as a projection surface. The multi-projection display 100 is placed, for example, on a rack 104, as shown in FIGS. 1A and 1B.

The casing 102 contains an image-pickup device 142 of an imaging unit 140 (refer to FIG. 3) therein (immediately inside the front surface). The imaging unit 140 has the range indicated by the broken line on the screen SCR as object range S. The object range S can be set freely.

Each projector unit 130 has optical correction means (not shown), allowing optical correction for the position and posture of the casing of each projector unit 130.

Figure 2:
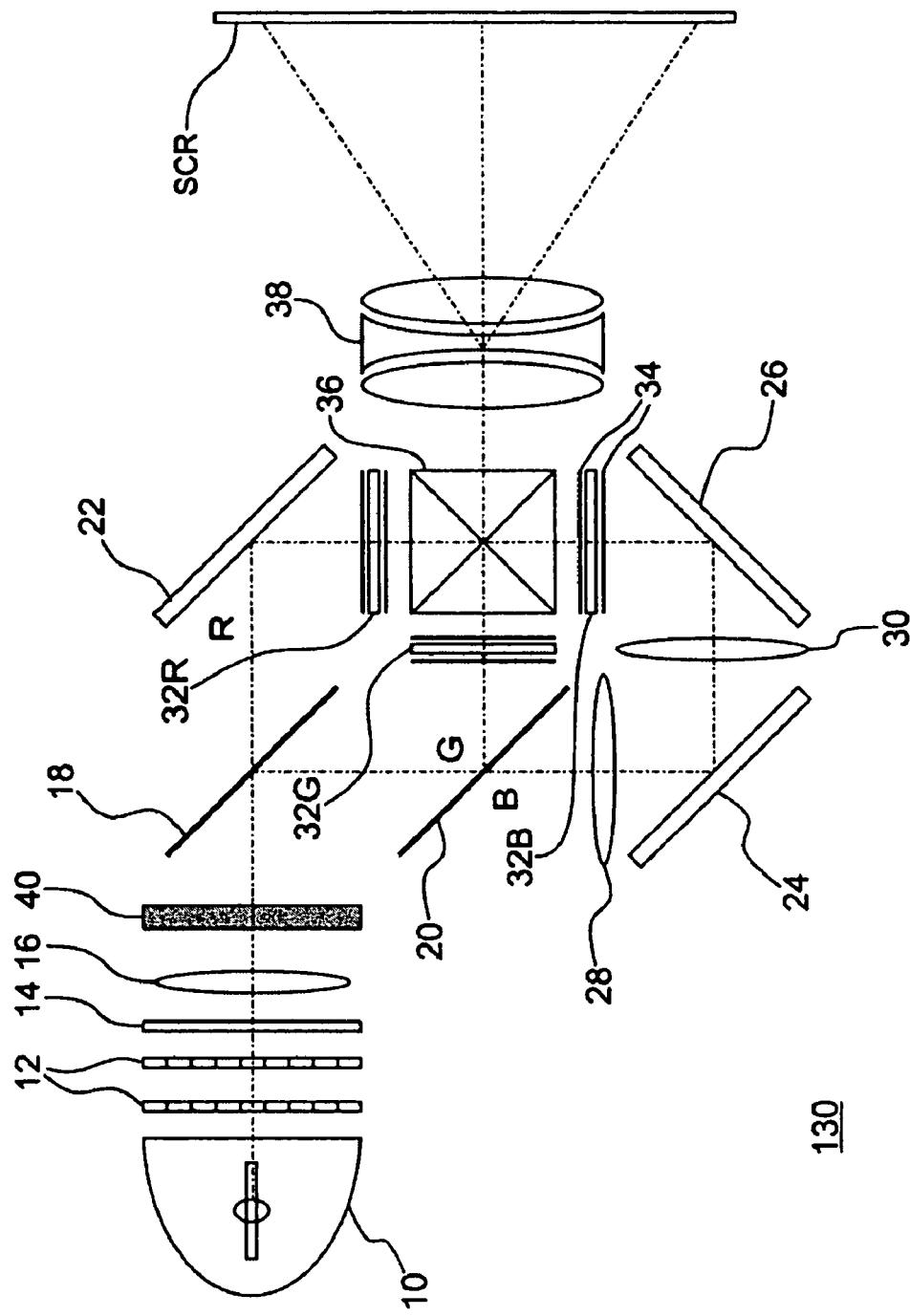
FIG. 2 is a schematic of the optical system of a projector unit used for the multi-projection display according to the first exemplary embodiment.

FIG. 2 is a schematic of the optical system of the projector unit 130 used in the multi-projection display 100 according to the first exemplary embodiment. As shown in FIG. 2, the projector unit 130 includes a light source 10, two integrator lenses 12, a polarization conversion element 14, a superimposing lens 16, a dichroic mirror 18 that passes a red light (R) therethrough and reflects a green light (G) and a blue light (B), a dichroic mirror 20 that passes a blue light (B) therethrough and reflects a green light (G), liquid crystal devices 32R, 32G, and 32B for color lights (red, green, and blue lights) serving as an electrooptic converter, a reflection mirror 22 for reflecting a red light into the liquid crystal device 32R, two reflection mirrors 24 and 26 for reflecting a blue light into the liquid crystal device 32B, a lens 28 disposed between the dichroic mirror 20 and the reflection mirror 24, a lens 30 disposed between the reflection mirror 24 and the reflection mirror 26, two polarizers 34 disposed on the light incident side and the light exiting side of each of the liquid crystal devices 32R, 32G, and 32B, a cross dichroic prism 36 serving as light combining system, and a projection lens 38 serving as projection system.

The dichroic mirrors 18 and 20, the reflection mirrors 22, 24, and 26, and the lenses 28 and 30 construct the color-separation waveguide system of the exemplary embodiments.

Each projector unit 130 further includes a light quantity controller 40 between the superimposing lens 16 and the dichroic mirror 18 in the optical path from the light source 10 to the color-separation waveguide system, the light quantity controller 40 controlling the quantity of light to be projected from the projection lens 38 by adjusting the transmittance of the light.

Figure 3:
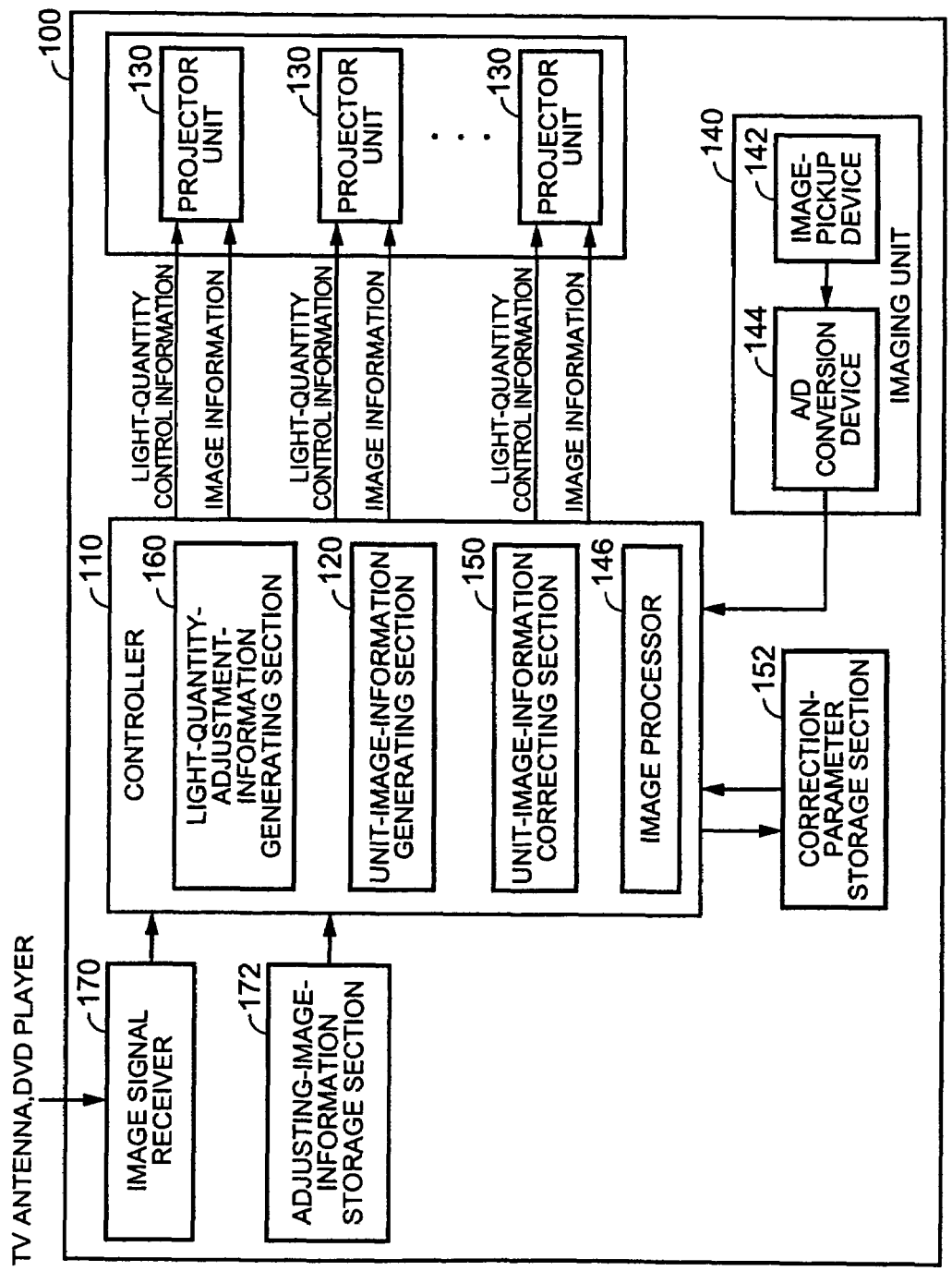
FIG. 3 is a block diagram schematic of the multi-projection display according to the first exemplary embodiment.

FIG. 3 is a block diagram schematic of the multi-projection display 100 according to the first exemplary embodiment. As shown in FIG. 3, the multi-projection display 100 includes an image signal receiver 170 that receives an image signal from a TV antenna or a DVD player, an adjusting-image-information storage section 172 that stores adjusting-image information, a plurality of projector units 130 that project projection images, a controller 110 that controls the activation of the projector units 130 etc., a correction-parameter storage section 152 that stores correction parameters used to correct unit images, and an imaging unit 140 that images a projection surface.

The controller 110 includes a unit-image-information generating section 120 that generates unit-image information on the unit images projected by the projector unit 130 in accordance with the original-image information from the image signal receiver 170 and the adjusting-image information from the adjusting-image-information storage section 172, a unit-image-information correcting section 150 that corrects the unit-image information from the results of imaging by the imaging unit 140, and an image processor 146 that applies image processing to the digital signal from an A/D conversion device 144 of the imaging unit 140.

A light-quantity-adjustment-information generating section 160 generates light-quantity adjustment information to control the light quantity controller 40 shown in FIG. 2. The light-quantity adjustment information generated by the light-quantity-adjustment-information generating section 160 is sent to the projector units 130 to control the light adjustment by the light quantity controller 40.

The light-quantity adjustment information to control the light quantity controller 40 can be generated by user's indication to the light-quantity-adjustment-information generating section 160. However, it is desirable that the light-quantity-adjustment-information generating section 160 automatically generate light-quantity adjustment information according to the results imaged by the imaging unit 140.

The imaging unit 140 includes an image-pickup device 142 that photographs a predetermined region of an adjustment image projected on the screen SCR and the A/D conversion device 144 that converts an analog signal from the image-pickup device 142 to a digital signal.

The image processor 146 has the function of applying image processing to the results imaged by the imaging unit 140, comparing it with the original adjustment-image information, and outputting the comparison to the unit-image-information correcting section 150.

The adjusting-image information storage section 172 has the function of storing information on adjustment image to be imaged by the imaging unit 140 at the correction of the unit-image information.

The unit-image-information correcting section 150 has the function of correcting the unit-image information so that the boundary between the unit images (including overlapped part) projected by adjacent projector units 130 of the multiple projector units 130 does not stand out on the screen SCR, based on the results imaged by the imaging unit 140.

The unit-image-information correcting function of the unit-image-information correcting section 150 includes intensity adjustment by software to equalize the intensity of the overlapped part to that of the other part (unoverlapped part).

Other correcting functions of the unit-image-information correcting section 150 are the function of comparing the entire adjustment image formed from the four pieces of adjustment unit-image information projected from the four projector units 130 with the original adjustment-image information and correcting the shape, position, and inclination of the unit images projected by the projector units 130 and the function of correcting the intensities and tones of color of the unit images projected by the projector units 130.

The correction can prevent the boundary between the projection images from the projector units 130, due to incorrect shape, position, and inclination thereof, from standing out on the screen SCR, and prevent the boundary between the projection images from the projector units 130 due to discontinuous intensity and color from standing out on the screen SCR.

The correction-parameter storage section 152 has the function of storing correction parameters determined when the unit-image-information correcting section 150 corrects unit-image information.

Figure 4:
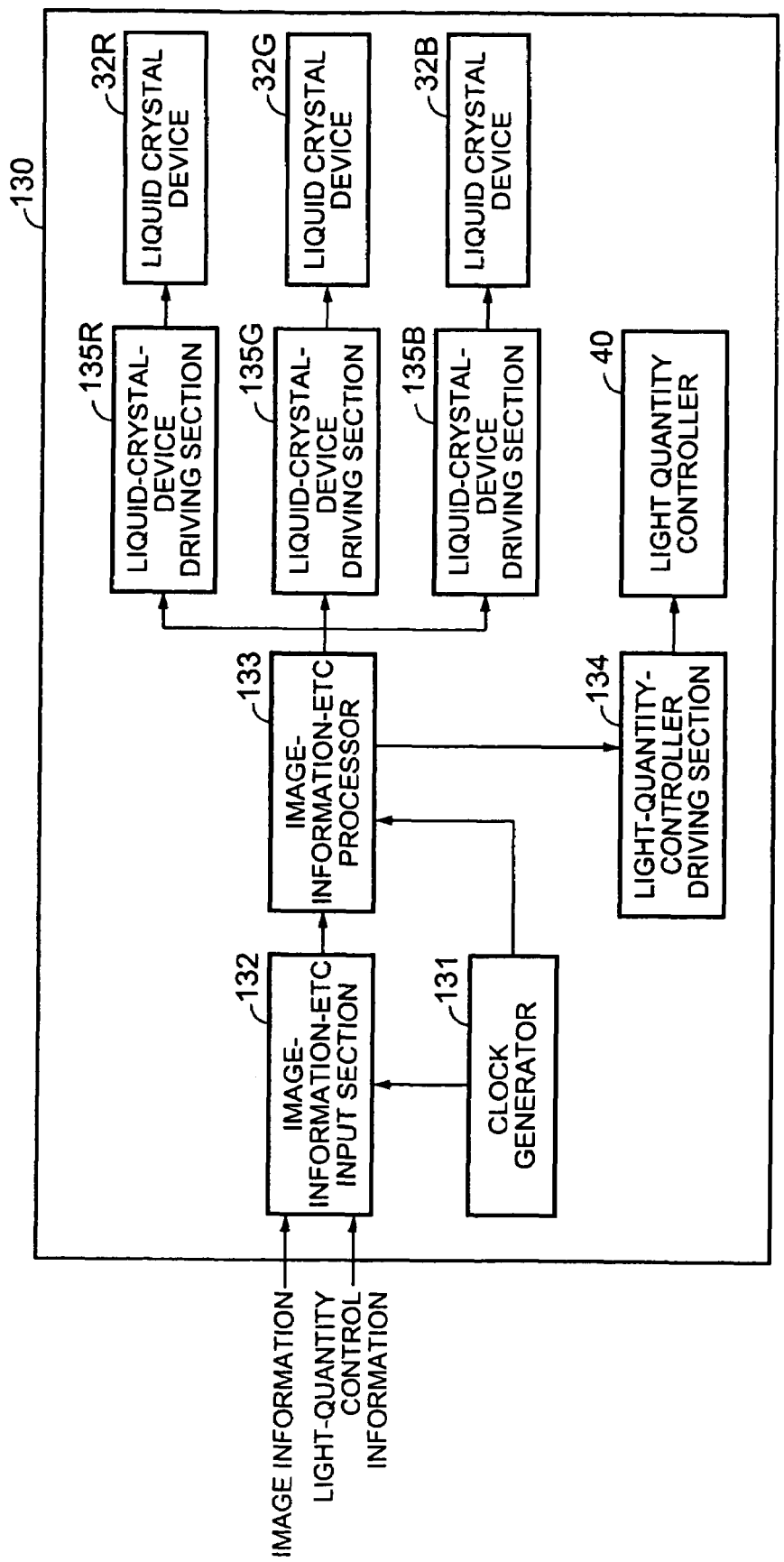
FIG. 4 is a block diagram schematic of the projector unit used for the multi-projection display according to the first exemplary embodiment.

FIG. 4 is a block diagram schematic of the projector unit 130 used for the multi-projection display 100 according to the first exemplary embodiment. As shown in FIG. 4, the projector unit 130 includes a clock generator 131, an image-information-etc input section 132 that inputs image information and light-quantity adjustment information from the controller 110 shown in FIG. 3, an image-information-etc-processor 133 that processes the image information and the light-quantity adjustment information, liquid crystal devices 32R, 32G, and 32B, liquid-crystal-device driving sections 135R, 135G, and 135B that drive the liquid crystal devices 32R, 32G, and 32B, the light quantity controller 40, and a light-quantity-controller driving section 134 that drives the light quantity controller 40.

Figure 5A:
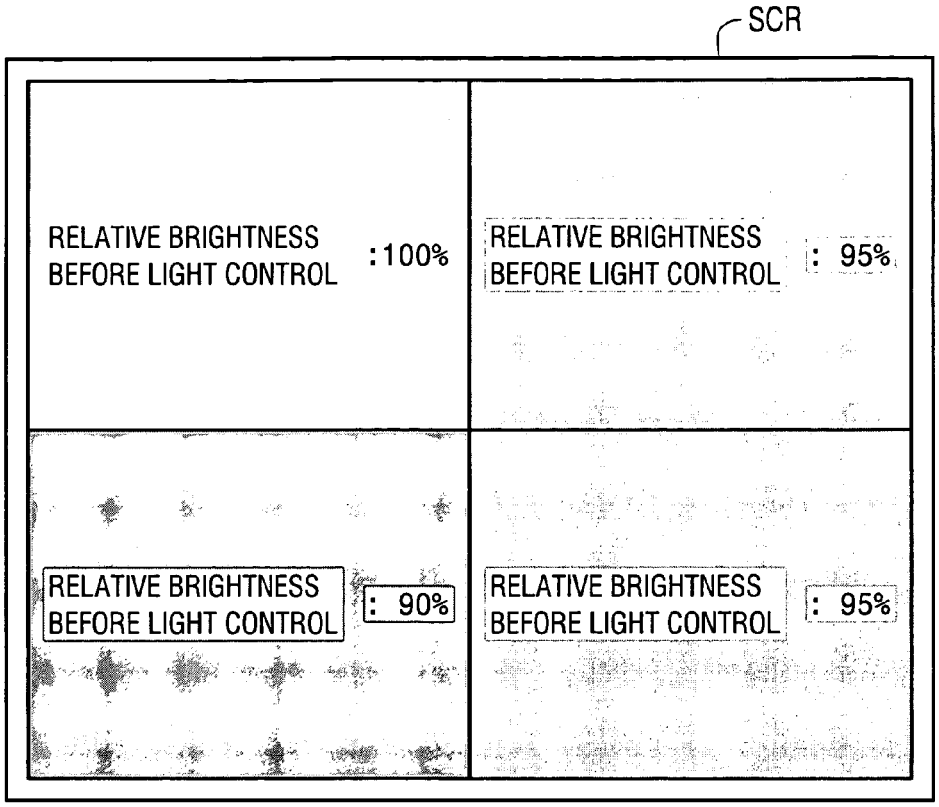
FIG. 5A is a schematic of the display state on the screen before light-quantity adjustment, in the case in which a highest-intensity white image is projected on the overall projection region from the projector units, in the first exemplary embodiment.
Figure 5B:
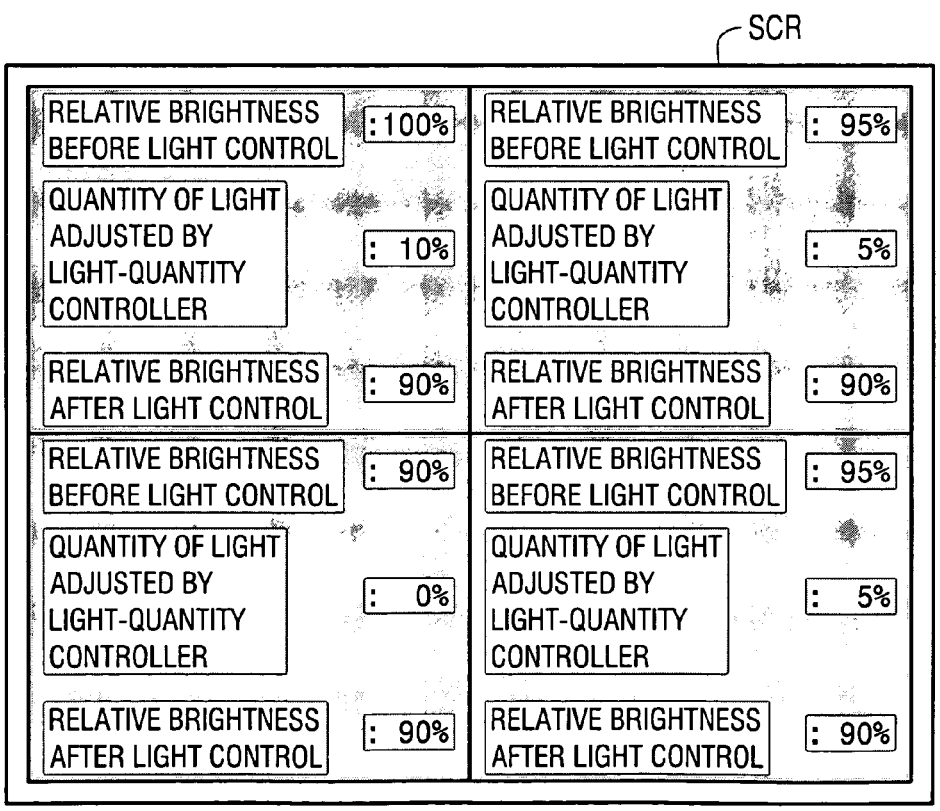
FIG. 5B is a schematic of the display state on the screen after light-quantity adjustment, in the case in which a highest-intensity white image is projected on the overall projection region from the projector units, in the first exemplary embodiment.

FIGS. 5A and 5B are schematics to explain the function of the multi-projection display 100 according to the first exemplary embodiment. FIG. 5A shows a display state on the screen before light-quantity adjustment in the case where a highest-intensity white image is projected on the overall projection region from the projector units 130. FIG. 5B shows a display state on the screen after light-quantity adjustment in the case where a highest-intensity white image is projected on the overall projection region from the projector units 130.

The multi-projection display 100 according to the first exemplary embodiment can adjust the quantity of light to be projected by the projection system one projector unit to another by the operation of the light quantity controller 40, even if the intensities and tones of color differ among the projector units 130. Accordingly, the intensities of the projector units can be consistent with one another.

For example, when a highest-intensity white image is projected on the overall projection region from each projector unit 130, the intensities of the projector units 130 can be consistent with one another by adjusting the brightness on the screen SCR to even brightness, as shown in FIG. 5B.

Thus, the multi-projection display 100 according to the first exemplary embodiment allows the intensities of the projector units to be consistent with one another, providing totally even images.

Figures 6A, 6B:
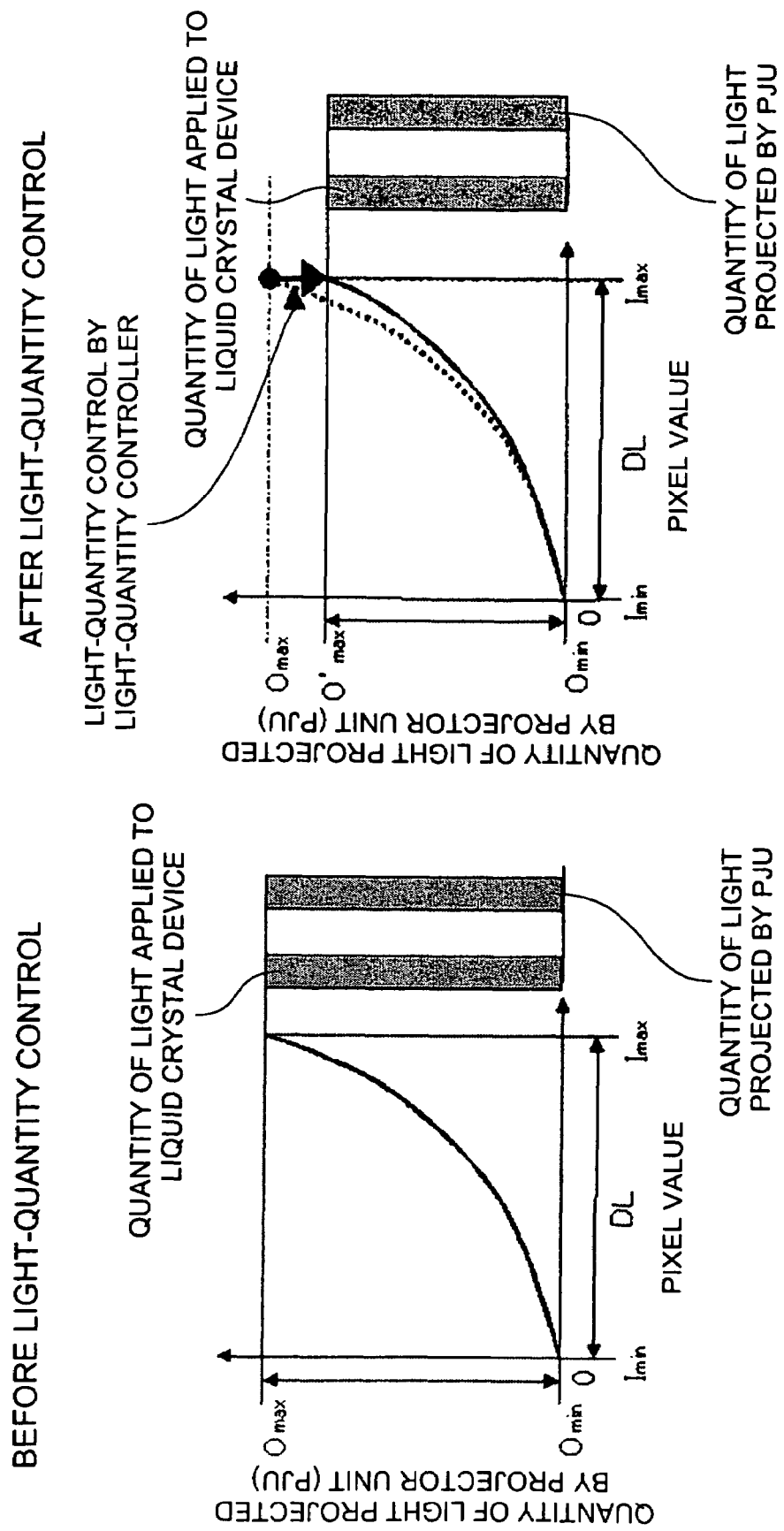
FIG. 6A is a graph showing the quantity of light projected from the projector unit before light-quantity adjustment in the first exemplary embodiment.
FIG. 6B is a graph showing the quantity of light projected from the projector unit after light-quantity adjustment in the first exemplary embodiment.

FIGS. 6A and 6B are graphs to explain the advantages of the multi-projection display 100 according to the first exemplary embodiment. FIG. 6A shows the quantity of light projected from the projector unit before light-quantity adjustment and FIG. 6B shows the quantity of light projected from the projector unit after light-quantity adjustment.

Figures 7A, 7B:
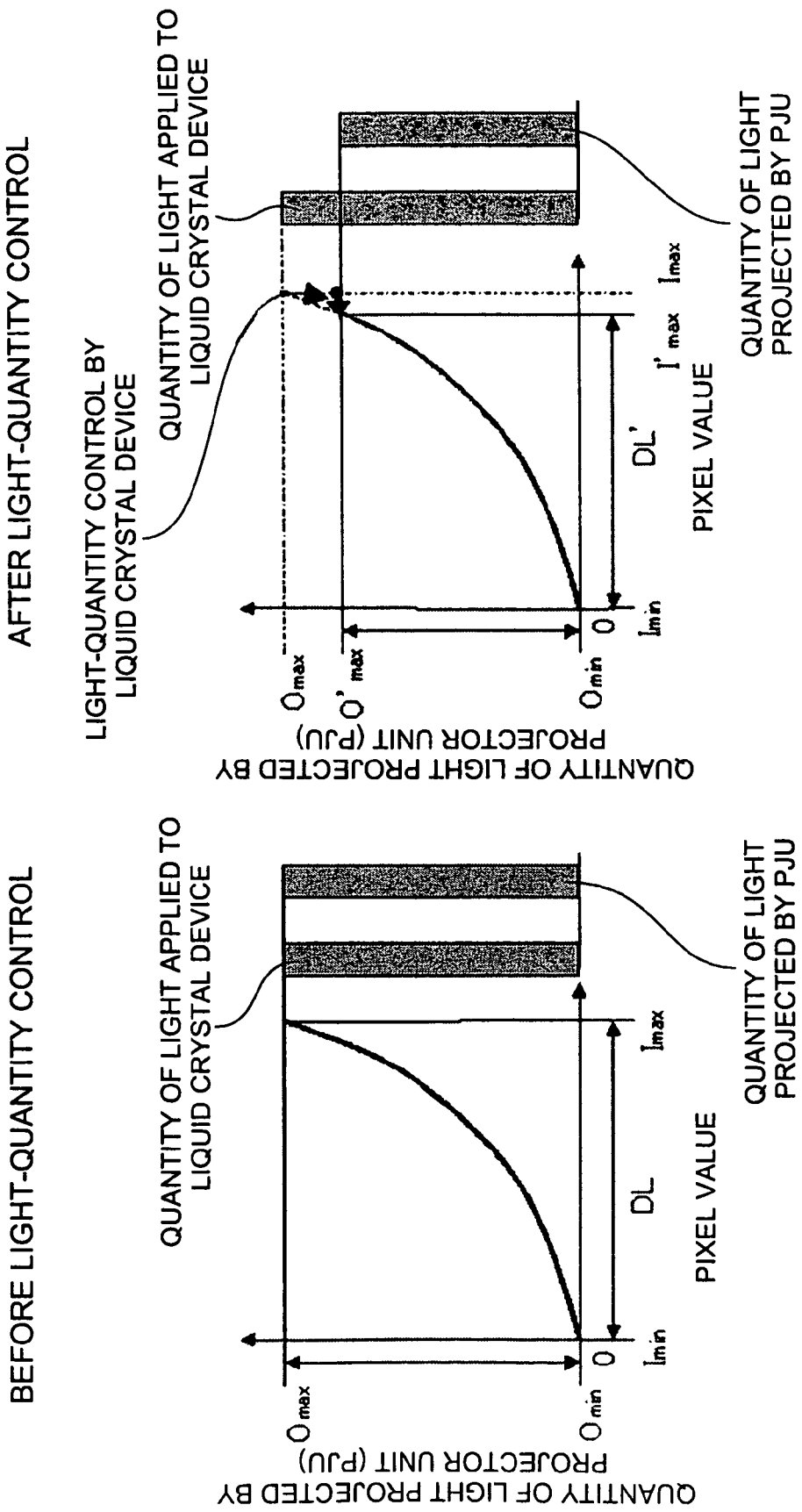
FIG. 7A is a graph showing the quantity of light projected from the projector unit before light-quantity adjustment in the first exemplary embodiment.
FIG. 7B is a graph showing the quantity of light projected from the projector unit after light-quantity adjustment in the first exemplary embodiment.

FIGS. 7A and 7B are graphs to explain the advantages of a multi-projection display of a comparative example. FIG. 7A shows the quantity of light projected from a projector unit before light-quantity adjustment and FIG. 7B shows the quantity of light projected from a projector unit after light-quantity adjustment.

The multi-projection display of the comparative example adjusts the light quantity to provide consistency in intensity among the projector units by decreasing the transmittance of the liquid crystal devices, as shown in FIG. 7B. This requires the use of gradation sources in the liquid crystal devices, posing the problem of decreasing the number of effective gray levels inherent to the multi-projection display or narrowing the dynamic range.

On the other hand, the multi-projection display 100 according to the first exemplary embodiment adjusts the quantity of light for each projector unit to provide consistency in intensity among the projector units by decreasing the transmittance of the light quantity controller 40, as shown in FIG. 6B. Therefore, the intensities and tones of color of the projector units 130 can be consistent with one another without using the gradation sources of the liquid crystal devices 32R, 32G, and 32B. Thus, totally even images can be displayed without decreasing the number of effective gray levels inherent to the multi-projection display or narrowing the dynamic range.

As has been described, the multi-projection display 100 according to the first exemplary embodiment can adjust the quantity of light to be projected from the projection lens 38, one projector unit 130 to another, using the light quantity controller 40. Accordingly, the intensities of the projector units can be consistent with one another without using the gradation sources of the liquid crystal devices 32R, 32G, and 32B of the projector units 130. Thus, totally even images can be displayed without decreasing the number of effective gray levels inherent to the multi-projection display or narrowing the dynamic range.

The multi-projection display 100 according to the first exemplary embodiment, which is a color multi-projection display having multiple liquid crystal devices for each projector unit 130, includes the light quantity controller 40, in the optical path from the light source 10, to the color-separation waveguide system. Accordingly, the intensities of the projector units 130 can be consistent with one another by adjusting the transmittance of the light quantity controller 40.

In the multi-projection display 100 according to the first exemplary embodiment, a dimmer that can control the transmittance of light is used as the light quantity controller 40. Accordingly, the transmittance of light or the quantity of light can be controlled freely by varying an applied voltage.

Examples of the dimmer are a liquid-crystal dimmer, an electrochromic device, and a rotary polarizer.

In the multi-projection display 100 according to the first exemplary embodiment, the light quantity controller 40 can adjust the quantity of light according to the photographed image of a projection image projected to the projection surface. Accordingly, the color multi-projection display that uses the liquid crystal devices 32R, 32G, and 32B for each of the projector units 130 can accurately be consistent in intensity with one another.

Also, the multi-projection display 100 according to the first exemplary embodiment includes an imaging unit that takes an image of a projection image projected to the projection surface, as described above. This allows the image projected to the projection surface to be imaged easily at any time, allowing light quantity to be adjusted immediately as the need arises. Accordingly, the multi-projection display can always display a totally even image.

Second Exemplary Embodiment

Figure 8:
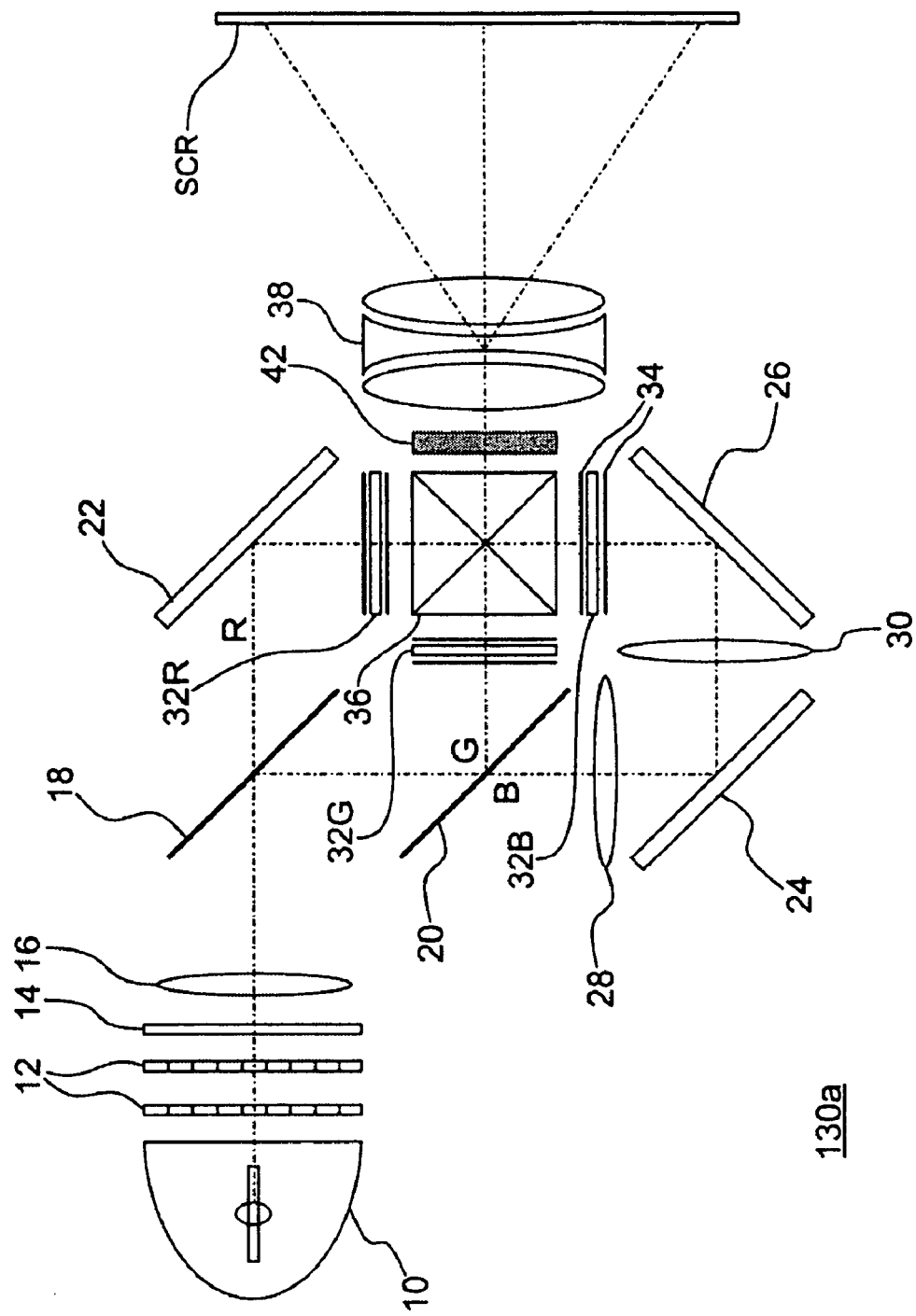
FIG. 8 is a schematic of the optical system of a projector unit used for a multi-projection display according to a second exemplary embodiment of the invention.

FIG. 8 is a schematic of the optical system of a projector unit 130a used for a multi-projection display (not shown) according to a second exemplary embodiment. The projector unit 130a is different in the position of the light quantity controller from the projector unit 130 used for the multi-projection display 100 according to the first exemplary embodiment, as shown in FIG. 8. Specifically, the projector unit 130a has a light quantity controller 42 between the cross dichroic prism 36 and the projection lens 38.

Although the multi-projection display according to the second exemplary embodiment is different in the position of the light quantity controller from the multi-projection display 100 according to the first exemplary embodiment, as described above, it has the same advantages as the multi-projection display 100 according to the first exemplary embodiment because it can control the quantity of light to be projected from the projection lens 38, one projector unit 130a to another, by using the light quantity controller 42.

In other words, the intensities and the tones of color of the projector units can be consistent with one another without using the gradation sources of the liquid crystal devices of the projector units. Thus, totally even images can be displayed without decreasing the number of effective gray levels inherent to the multi-projection display or narrowing the dynamic range.

Third Exemplary Embodiment

Figure 9:
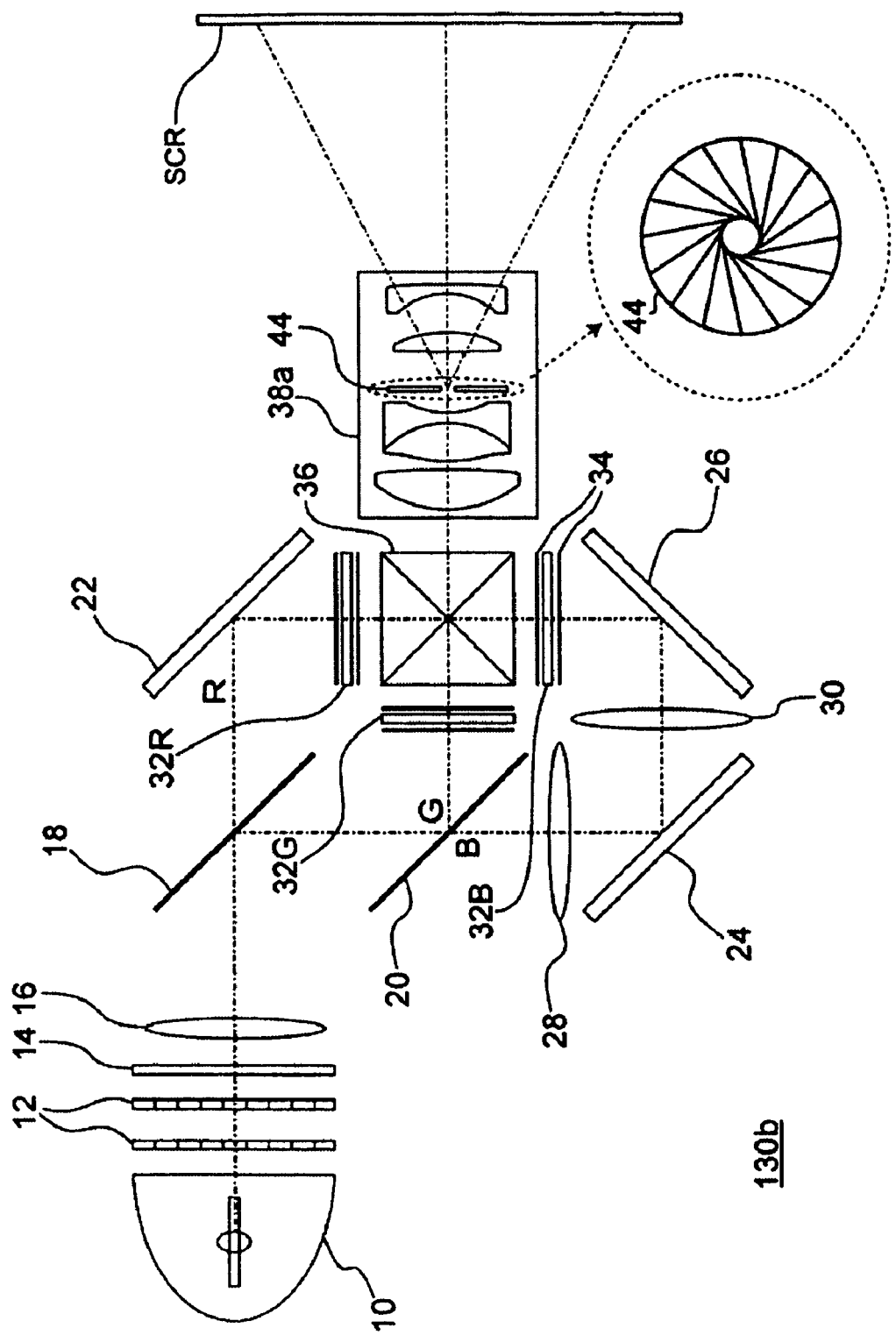
FIG. 9 is a schematic of the optical system of a projector unit used for a multi-projection display according to a third exemplary embodiment of the invention.

FIG. 9 is a schematic of the optical system of a projector unit 130b used for a multi-projection display (not shown) according to a third exemplary embodiment. The projector unit 130b is different in the position and structure of the light quantity controller from the projector units 130 and 130a used in the first and second exemplary embodiments, as shown in FIG. 9. Specifically, the projector unit 130b has a light quantity controller 44 in a projection lens 38a. The light quantity controller 44 is constructed of a light limiting device that can adjust the passage of light.

Although the multi-projection display according to the third exemplary embodiment is different in the position and structure of the light quantity controller from the multi-projection displays according to the first and second exemplary embodiments, as described above, it has the same advantages as the multi-projection displays according to the first and second exemplary embodiments because it can control the quantity of light to be projected from the projection lens 38a, one projector unit 130b to another, by using the light quantity controller 44.

In other words, the intensities and the tones of color of the projector units can be consistent with one another without using the gradation sources of the liquid crystal devices of the projector units. Thus, totally even images can be displayed without decreasing the number of effective gray levels inherent to the multi-projection display or narrowing the dynamic range.

Fourth Exemplary Embodiment

Figure 10:
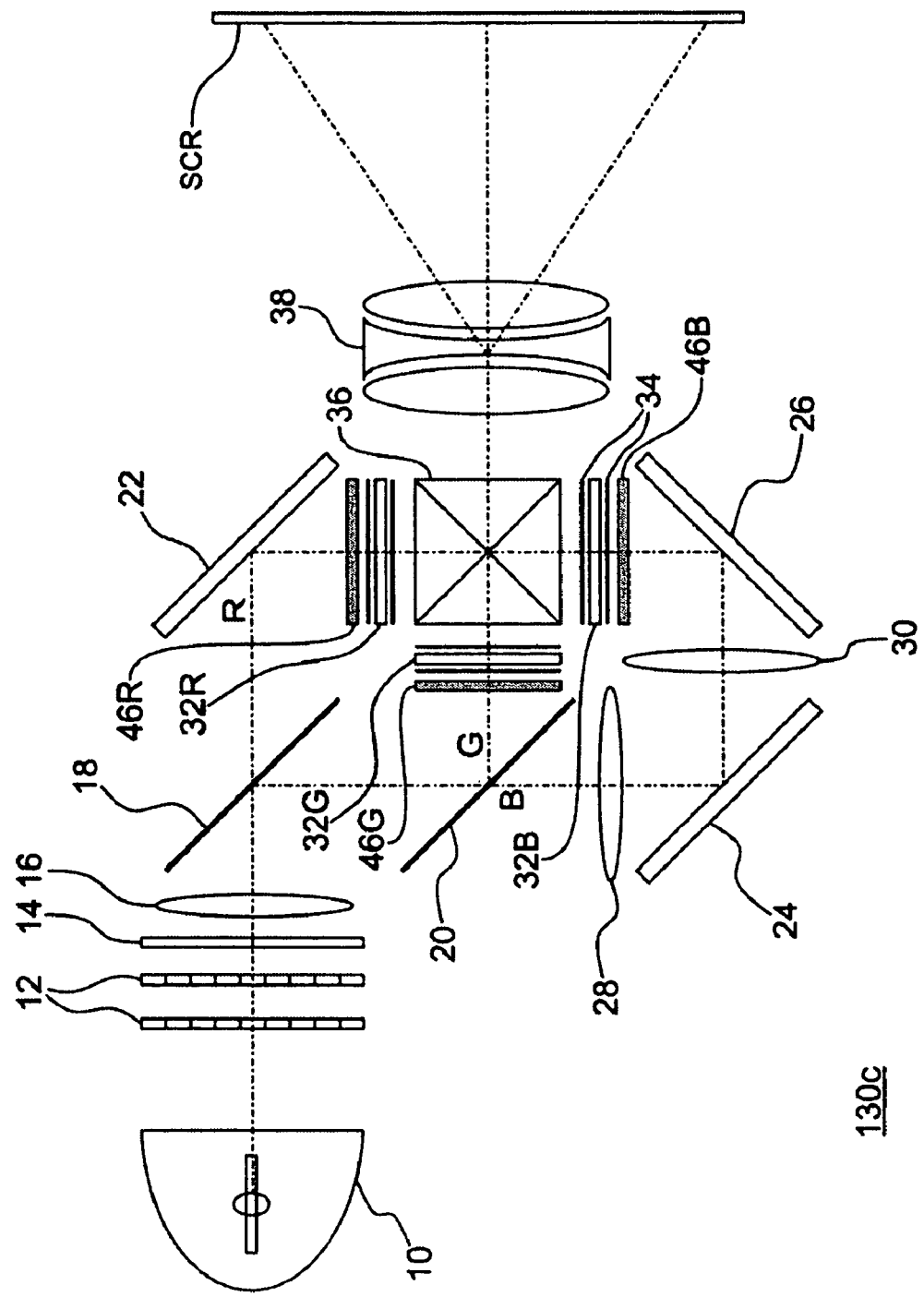
FIG. 10 is a schematic of the optical system of a projector unit used for a multi-projection display according to a fourth exemplary embodiment of the invention.
Figure 11:
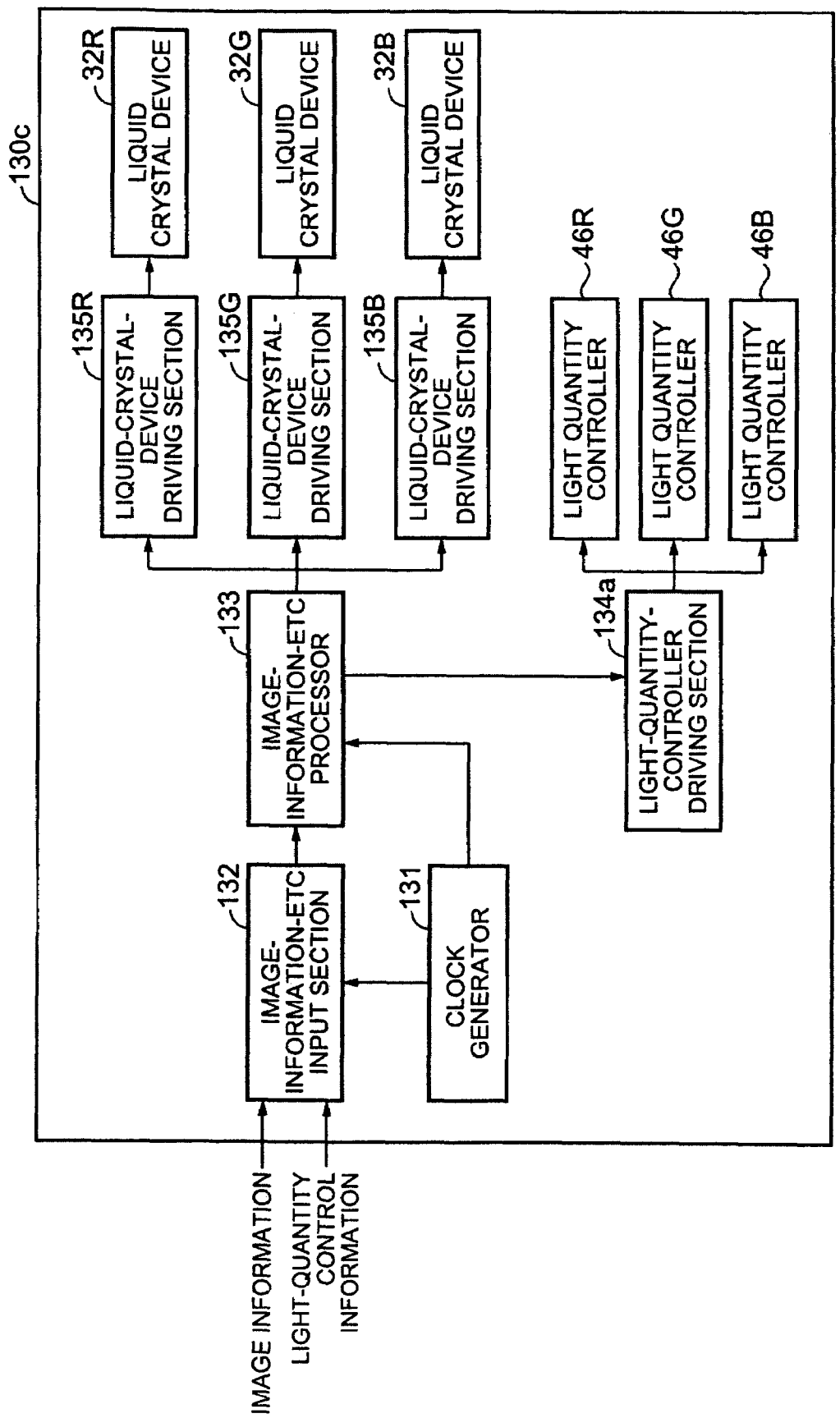
FIG. 11 is a block diagram schematic of the projector unit used for the multi-projection display according to the fourth exemplary embodiment.

FIG. 10 is a schematic of the optical system of a projector unit 130c used for a multi-projection display (not shown) according to a fourth exemplary embodiment. FIG. 11 is a block diagram schematic of the projector unit 130c used for the multi-projection display according to the fourth exemplary embodiment.

As shown in FIG. 10, the projector unit 130c used for the multi-projection display according to the fourth exemplary embodiment is different in the position and number of the light quantity controllers from the projector units 130, 130a, and 130b used for the multi-projection displays according to the first to third exemplary embodiments, respectively. Specifically, the projector unit 130c has light quantity controllers 46R, 46G, and 46B on the position adjacent to the light source 10 with respect to the liquid crystal devices 32R, 32G, and 32B, respectively. The light quantity controllers 46R, 46G, and 46B are disposed in correspondence with color lights that pass through the liquid crystal devices 32R, 32G, and 32B.

As shown in FIG. 11, the projector unit 130c includes a light-quantity-controller driving section 134a that drives the light quantity controllers 46R, 46G, and 46B.

Although the multi-projection display according to the fourth exemplary embodiment is different in the position and number of the light quantity controllers from the multi-projection displays according to the first to third embodiments, respectively, as described above, it has the same advantages as the multi-projection displays according to the first to third embodiments, respectively, because it can control the quantity of light to be projected from the projection lens 38, one projector unit 130c to another, by using the light quantity controllers 46R, 46G, and 46B.

In other words, the intensities and the tones of color of the projector units can be consistent with one another without using the gradation sources of the liquid crystal devices of the projector units. Thus, totally even images can be displayed without decreasing the number of effective gray levels inherent to the multi-projection display or narrowing the dynamic range.

Furthermore, in the multi-projection display according to the fourth exemplary embodiment, the light quantity controllers 46R, 46G, and 46B control the amounts of color lights that pass through the liquid crystal devices 32R, 32G, and 32B, respectively. Accordingly, in addition to the intensities, the tones of color can be consistent with one another from one projector unit to another.

Fifth Exemplary Embodiment

A multi-projection display (not shown) according to a fifth exemplary embodiment has substantially the same structure as that of the multi-projection display according to the fourth exemplary embodiment. The multi-projection display according to the fifth exemplary embodiment has the function of adjusting the quantity of light in consideration of information on projection image in addition to the function of the multi-projection display according to the fourth exemplary embodiment.

Specifically, in the multi-projection display according to the fifth exemplary embodiment, light quantity controllers (not shown) have the function of adjusting the quantity of light dynamically in consideration of the information on the image to be projected by the projector unit (not shown).

The multi-projection display according to the fifth exemplary embodiment can control the quantity of light to be projected from the projection lens (not shown), one projector unit to another, by using the light quantity controllers, as with the multi-projection display according to the fourth exemplary embodiment. Accordingly, the intensities and the tones of color of the projector units can be consistent with one another without using the gradation sources of the liquid crystal devices of the projector units. Thus, totally even images can be displayed without decreasing the number of effective gray levels inherent to the multi-projection display or narrowing the dynamic range.

The multi-projection display according to the fifth exemplary embodiment has the following advantages in addition to the above-described advantages.

Figure 12A:
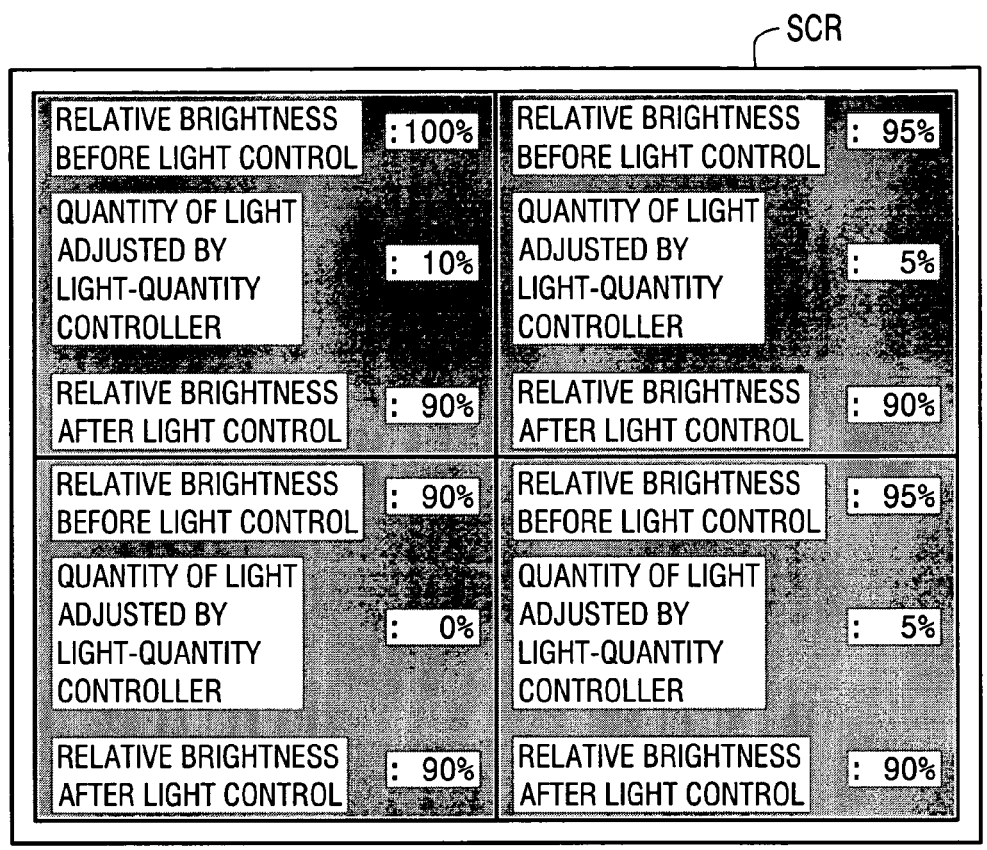
FIG. 12A is a schematic of a display example in which an image to be projected is light as a whole in a fifth exemplary embodiment of the invention.

FIGS. 12A to 12C are schematics to explain the function of the multi-projection display according to the fifth exemplary embodiment. FIG. 12A shows a display example in which an image to be projected is light as a whole; FIG. 12B shows a display example in which an image to be projected is dark as a whole; and FIG. 12C shows a display example in which an image to be projected has variations in brightness from region to region.

In the multi-projection display (not shown) according to the fifth exemplary embodiment, the light quantity controllers can control the quantity of light according to the brightness of projection images even when the images to be projected by themselves are dark as well as they are light, as shown in FIG. 12B. Accordingly, most of the gradation sources of the liquid crystal devices 32R, 32G, and 32B can be used only for expressing gradation between the lightest region and the darkest region of the image to be projected by the projector unit itself.

Also when the image to be projected by the projector unit itself has variations in brightness from region to region, as shown in FIG. 12C, the light quantity controllers can provide the optimum light-quantity control according to the brightness of the projection image from one projector unit to another. Accordingly, most of the gradation sources of the liquid crystal devices 32R, 32G, and 32B can be used only for expressing gradation between the lightest region and the darkest region of the image to be projected by the projector unit itself.

The multi-projection display according to the fifth exemplary embodiment therefore has the advantage of increasing the number of effective gray levels of the multi-projection display or broadening the dynamic range, in addition to the advantage of the multi-projection display according to the fourth exemplary embodiment.

Sixth Exemplary Embodiment

A multi-projection display (not shown) according to a sixth exemplary embodiment has substantially the same structure as that of the multi-projection display according to the fifth exemplary embodiment. The multi-projection display according to the sixth exemplary embodiment has the function of adjusting the quantity of light in response to variation with age in the quantity of light from the light source 10, in addition to the function of the multi-projection display according to the fifth exemplary embodiment.

Specifically, in the multi-projection display according to the sixth exemplary embodiment, light quantity controllers (not shown) have the function of adjusting the quantity of light in response to variation with age in the quantity of light from the light source 10 with use.

FIGS. 13A and 13B are schematics to explain the function of the multi-projection display according to the sixth exemplary embodiment. FIG. 13A shows a display state when the light source 10 is put into use. FIG. 13B shows a display state when the light source 10 was used for a long time.

Specifically, at the start of using the light source 10, the quantity of light to be adjusted by the light quantity controllers is set stronger than that of the multi-projection display according to the fifth exemplary embodiment. Thus, a decrease in intensity of the light source 10 because of using the light source 10 can be compensated by decreasing the quantity of light adjusted by the light quantity controllers.

Also a change in the color temperature of the light source 10 due to using the light source 10 can be compensated flexibly because the quantity of light adjusted by the light quantity controllers can be changed from color to color.

In the multi-projection display according to the sixth exemplary embodiment, the light quantity controllers have the function of controlling the quantity of light in response to variation with age in the quantity of light from the light source 10. Accordingly, it has the following advantages in addition to the advantages of the multi-projection display according to the fifth exemplary embodiment.

Specifically, even when the intensity or the color temperature of the light source 10 is changed owing to the long use of the light source 10, the decrease in the intensity or the change in color temperature of the light source 10 can be compensated in response to that, allowing the image quality of the multi-projection display to be kept constant.

Seventh Exemplary Embodiment

Figure 14:
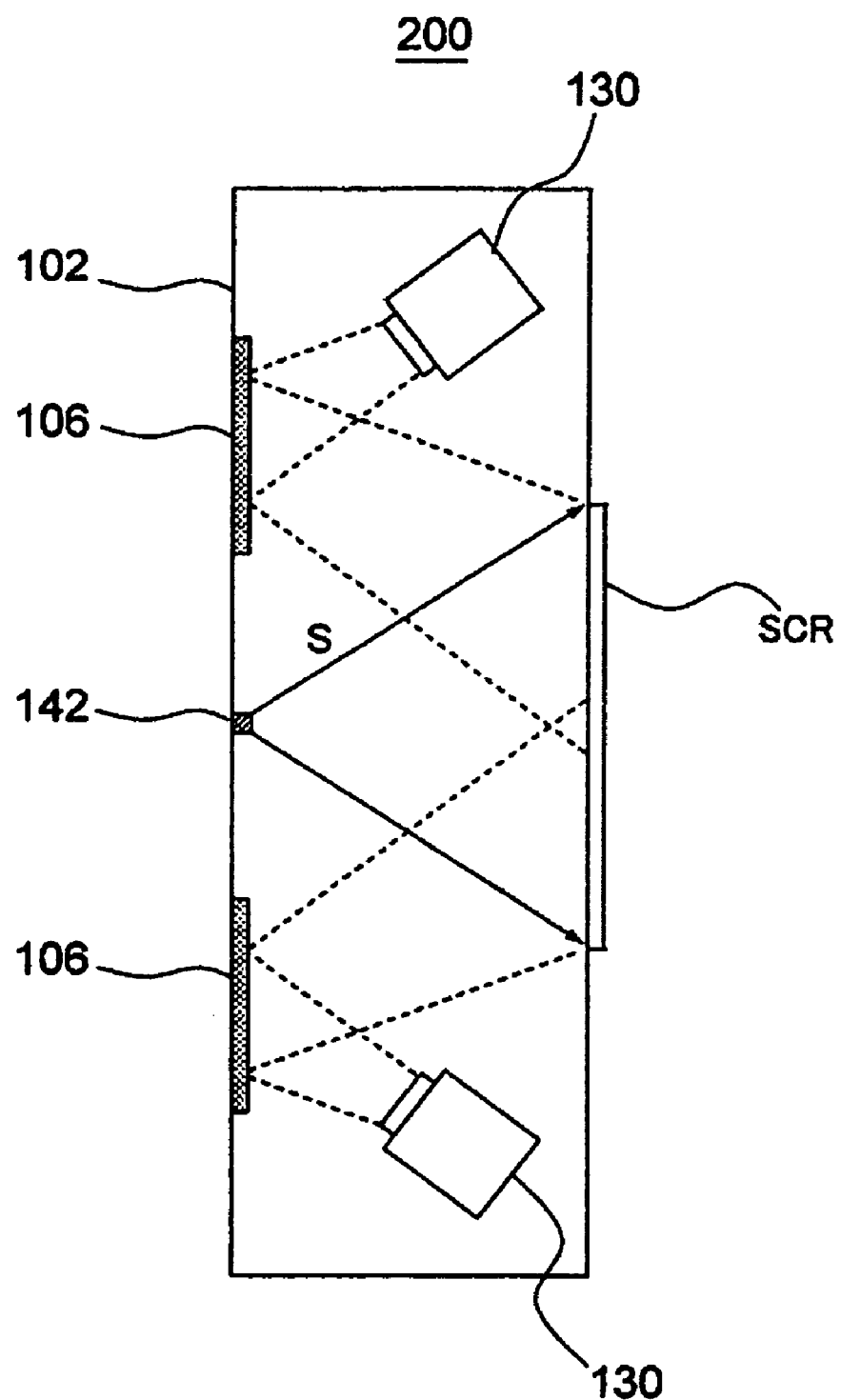
FIG. 14 is a schematic of the structure of a multi-projection display according to a seventh exemplary embodiment of the invention.
Figure 15:
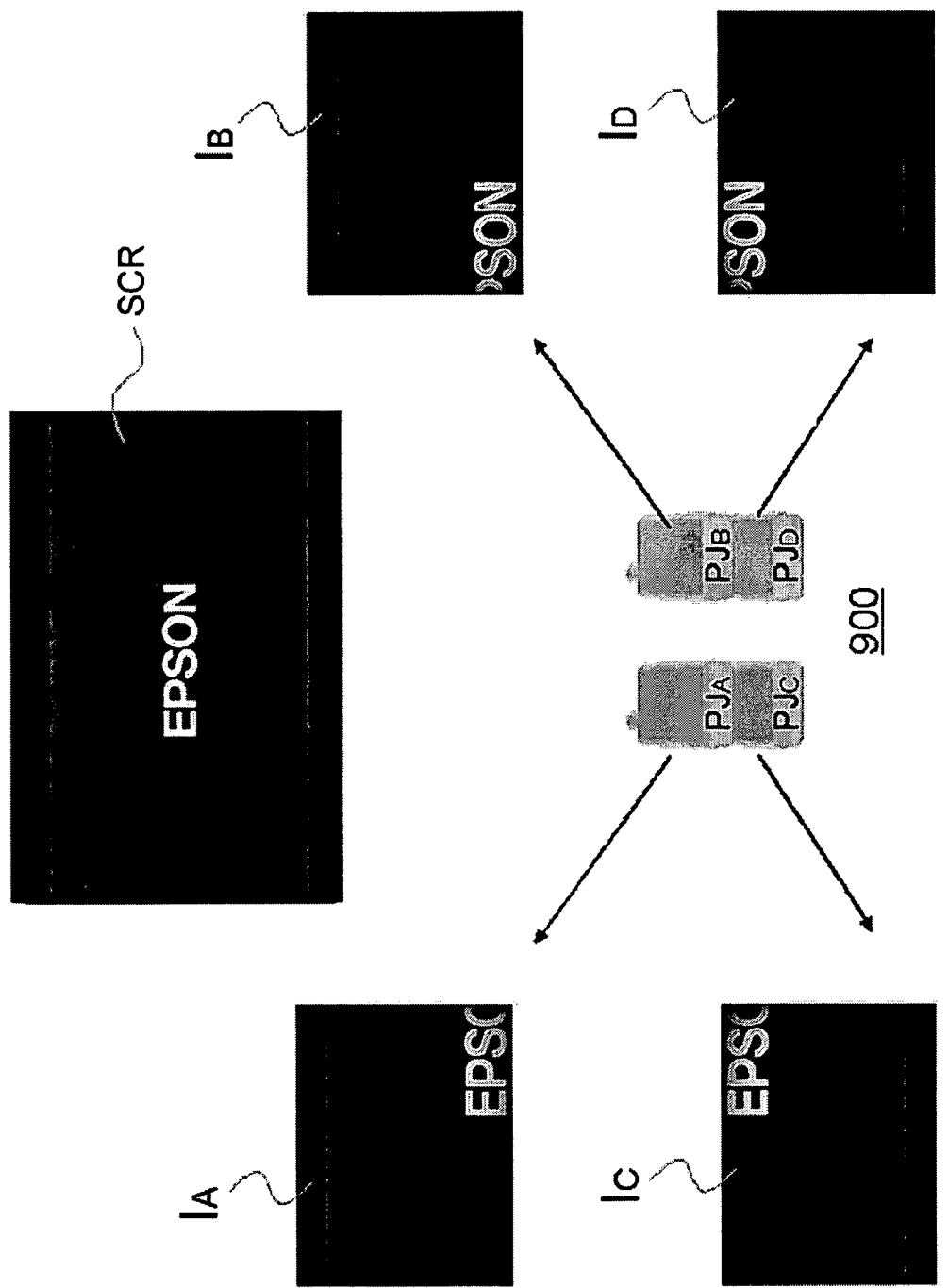
FIG. 15 is a schematic of a multi-projection display of the related art.
Figure 16:
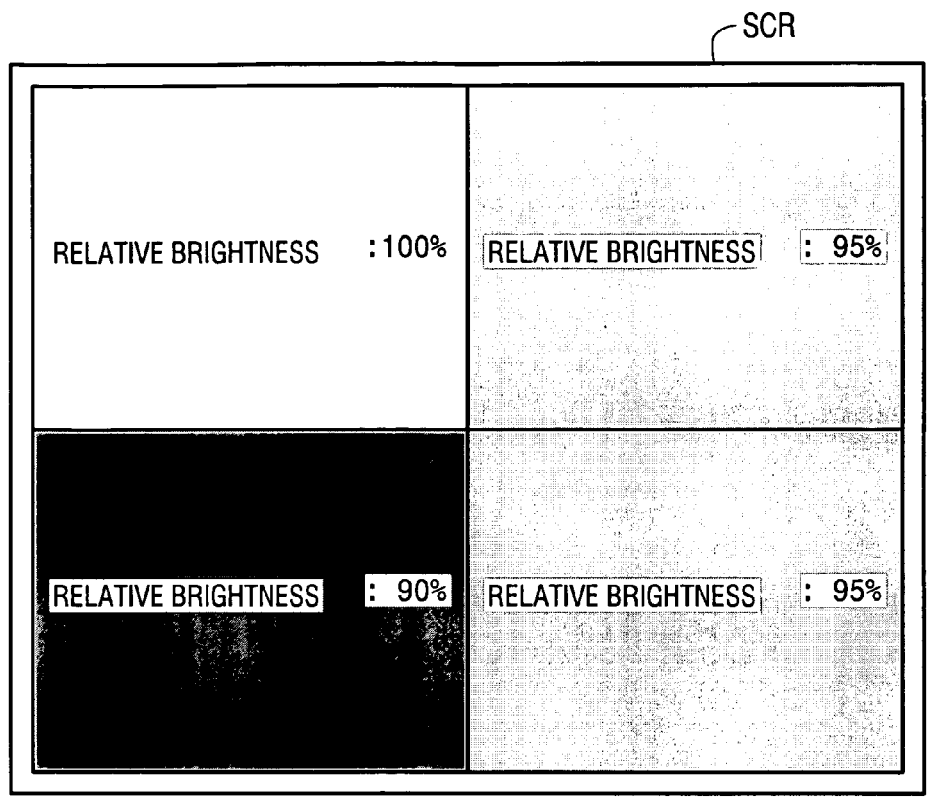
FIG. 16 is a schematic of the problems of a related-art multi-projection display.
Figure 17:
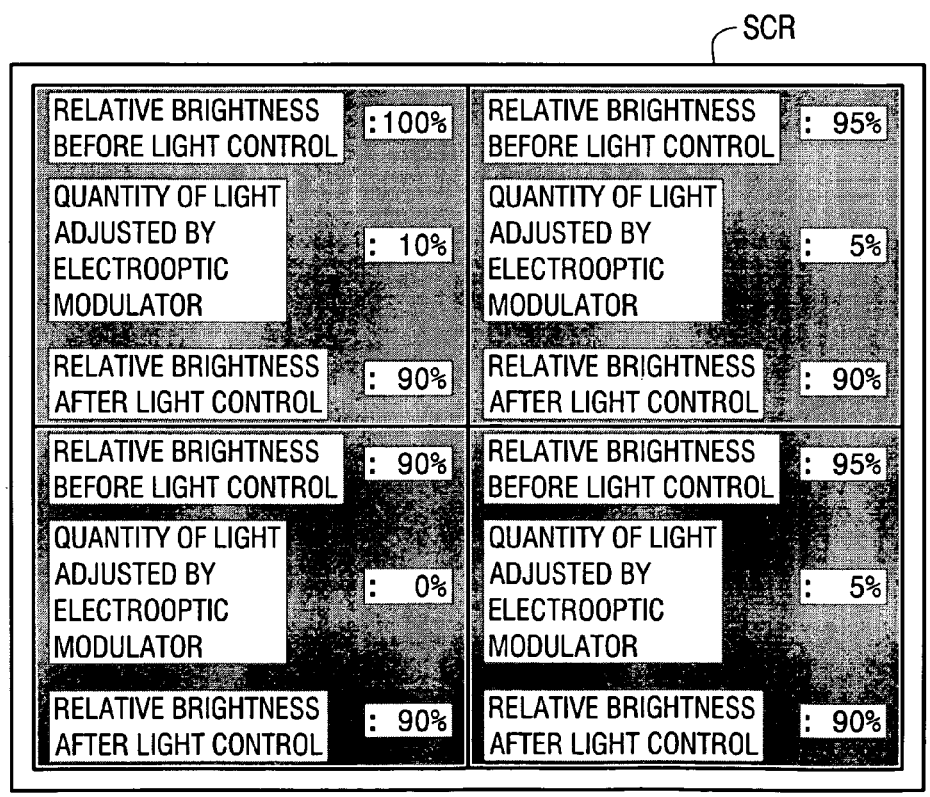
FIG. 17 is a schematic to explain the function of a related-art multi-projection display in which the problems are solved.

FIG. 14 is a schematic of the structure of a multi-projection display 200 according to a seventh exemplary embodiment. The multi-projection display 200 is a rear projection type multi-projection display, as shown in FIG. 14, different from the multi-projection displays according to the first to sixth exemplary embodiments.

Although the multi-projection display 200 according to the seventh exemplary embodiment is a rear projection type multi-projection display different from the multi-projection displays according to the first to sixth exemplary embodiments, as described above, it has the same advantages as those of the multi-projection displays according to the first to sixth exemplary embodiments because it can control the quantity of light to be projected from the projection lens, from one projector unit 130 to another, by using a light quantity controller.

Specifically, the intensities and the tones of color of the projector units can be consistent with one another without using the gradation sources of the liquid crystal devices of the projector units. Thus, totally even images can be displayed without decreasing the number of effective gray levels inherent to the multi-projection display or narrowing the dynamic range.

While the multi-projection display and the projector unit according to the exemplary embodiments have been described with reference to specific embodiments herein, it is to be understood that the exemplary embodiments are not limited to the specific embodiments but rather be construed broadly within the spirit and scope of the invention. For example, the following modifications may be made:

(1) While the multi-projection displays of the foregoing embodiments adopt transmissive liquid crystal device as electrooptic modulator, the exemplary embodiments do not necessarily have to adopt it. The electrooptic modulator has to generally only modulate incident light according to image information, such as a reflective liquid crystal device or a micromirror optical modulator. As the micromirror optical modulator, for example, a digital micromirror device (DMD) may be used.

(2) While the multi-projection display according to the third exemplary embodiment has the light quantity controller 44 constructed of a light limiting device, disposed in the projection lens 38, the exemplary embodiments are not limited to that. For example, a light source lamp that includes an ellipsoidal reflector may be used as light source lamp, and the light quantity controller may be disposed in a position to which light from the ellipsoidal reflector converges (for example, between the ellipsoidal reflector and a parallelizing convex lens, or the vicinity of the position where the converged light from the ellipsoidal reflector enters the incident surface of an integrator rod).

What is claimed is:

1. A multi-projection display, comprising:
a plurality of projector units, each including a light source, an electrooptic modulator, and a projection system, the multi-projection display displaying an image on a projection screen by tiling projection using the plurality of projector units,
each of the plurality of projector units further including a light-quantity controller that controls the quantity of light to be projected from the projection system after a light to be controlled is emitted from the light source and before coloration of the light to be controlled, the light-quantity controller controlling the quantity of light on the basis of an imaged result of a projection image projected to a projection surface, and controlling the quantity of light in response to variation due to age in the quantity of light from the light source; and
an imaging device that images the projection image projected to the projection surface.

2. The multi-projection display according to claim 1, the light-quantity controller being a dimmer capable of adjusting a transmission of light or being an optical limiting device capable of adjusting a passage of light.

3. The multi-projection display according to claim 1, the plurality of projection units each including:
a plurality of electrooptic modulators as the electrooptic modulator,
a color-separation waveguide system that separates light from the light source into multiple color lights and guides each of the multiple color lights to the plurality of electrooptic modulators, respectively, and
a color combining system that combines the multiple color lights modulated by the plurality of electrooptic modulators; and
the light-quantity controller being disposed in an optical path from the light source to the color-separation waveguide system or an optical path from the color combining system to the projection system.

4. The multi-projection display according to claim 1, the plurality of projection units each including:
a plurality of electrooptic modulators as the electrooptic modulator,
a color-separation waveguide system that separates light from the light source into multiple color lights and guides the multiple color lights to the electrooptic modulators, respectively, and
a color combining system that combines the color lights modulated by the plurality of electrooptic modulators; and
the light-quantity controller being disposed in each of optical paths from the color-separation waveguide system to the color combining system.

5. The multi-projection display according to claim 1, the light-quantity controller controlling the quantity of light dynamically in consideration of information on an image to be projected by a projector unit to which the controller itself belongs.

6. A projector unit used for a multi-projection display, comprising:
a light source;
an electrooptic modulator;
a projection system;
a light-quantity controller that controls the quantity of light to be projected from the projection system after a light to be controlled is emitted from the light source and before coloration of the light to be controlled, the light-quantity controller controlling the quantity of light on the basis of an imaged result of a projection image projected to a projection surface, and controlling the quantity of light in response to variation due to age in the quantity of light from the light source; and
an imaging device that images the projection image projected to the projection surface.

* * * * *